United States Patent
Kato et al.

(10) Patent No.: US 8,393,590 B2
(45) Date of Patent: Mar. 12, 2013

(54) VEHICLE SEAT RAIL ASSEMBLY

(75) Inventors: Hideyuki Kato, Toyota (JP); Hiromasa Hayakawa, Toyoake (JP); Masaharu Nakamura, Kariya Aichi (JP)

(73) Assignees: Toyota Jidosha Kabushiki Kaisha, Toyota-shi (JP); Toyota Boshoku Kabushiki Kaisha, Kariya-Shi (JP); Aisin Seiki Kabushiki Kaisha, Kariya-Shi (JP)

( * ) Notice: Subject to any disclaimer, the term of this patent is extended or adjusted under 35 U.S.C. 154(b) by 393 days.

(21) Appl. No.: 12/672,118

(22) PCT Filed: Aug. 8, 2008

(86) PCT No.: PCT/IB2008/002098
§ 371 (c)(1),
(2), (4) Date: Mar. 9, 2010

(87) PCT Pub. No.: WO2009/022214
PCT Pub. Date: Feb. 19, 2009

(65) Prior Publication Data
US 2011/0233365 A1  Sep. 29, 2011

(30) Foreign Application Priority Data
Aug. 10, 2007  (JP) .................. 2007-209535

(51) Int. Cl.
A45D 19/04 (2006.01)
F16M 13/00 (2006.01)
A47C 1/00 (2006.01)

(52) U.S. Cl. ............... 248/394; 248/429; 297/344.1; 297/344.13

(58) Field of Classification Search .......... 248/429, 248/430, 424; 297/344.11; 296/65.13
See application file for complete search history.

(56) References Cited

U.S. PATENT DOCUMENTS

| | | | |
|---|---|---|---|
| 5,482,243 A | 1/1996 | Minder | |
| 6,511,032 B1 * | 1/2003 | Lee | 248/429 |
| 2003/0085330 A1 * | 5/2003 | Lee | 248/430 |
| 2005/0230591 A1 * | 10/2005 | Smith et al. | 248/429 |

FOREIGN PATENT DOCUMENTS

| | | |
|---|---|---|
| DE | 202004010499 U1 | 11/2005 |
| JP | 2550172 | 6/1997 |

* cited by examiner

*Primary Examiner* — Teri P. Luu
*Assistant Examiner* — Erin W Smith
(74) *Attorney, Agent, or Firm* — Gifford, Krass, Sprinkle, Anderson & Citkowski, P.C.

(57) ABSTRACT

A vehicle seat rail assembly has a lower rail having a guide groove opening upward in the vertical direction of the vehicle body, that extends in a direction coincident with the longitudinal direction of the vehicle, and supported stationary relative to the vehicle body; an upper rail attached to a vehicle seat and guided by the lower rail to slide in the longitudinal direction of the vehicle; and a cover mechanism that is disposed between a pair of inner walls that define the guide groove of the lower rail and that closes the guide groove. The cover mechanism includes a stationary cover that remains stationary relative to the lower rail and a movable cover that slides relative to stationary cover.

15 Claims, 12 Drawing Sheets

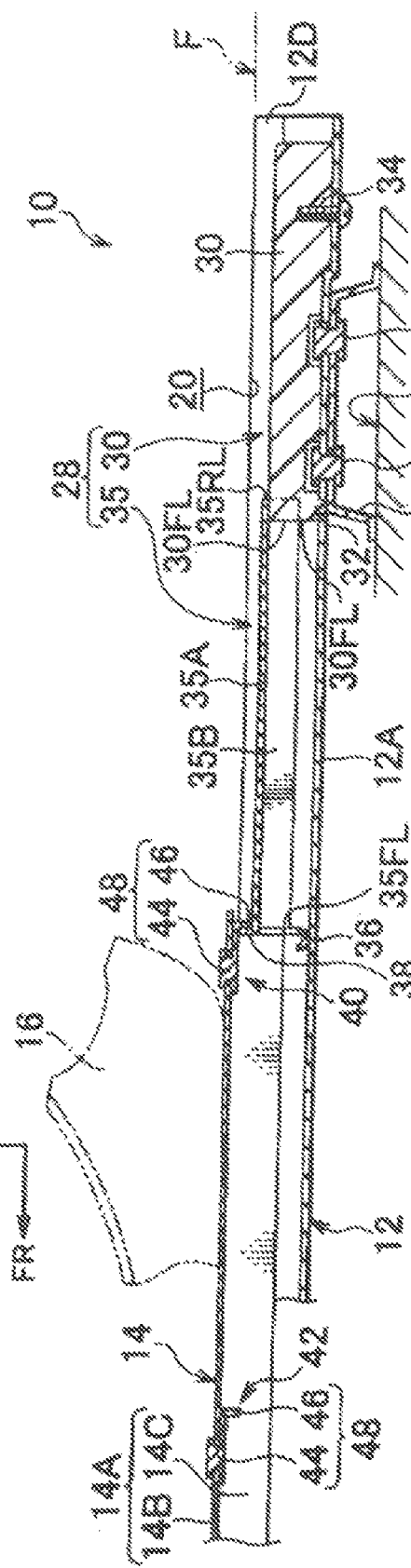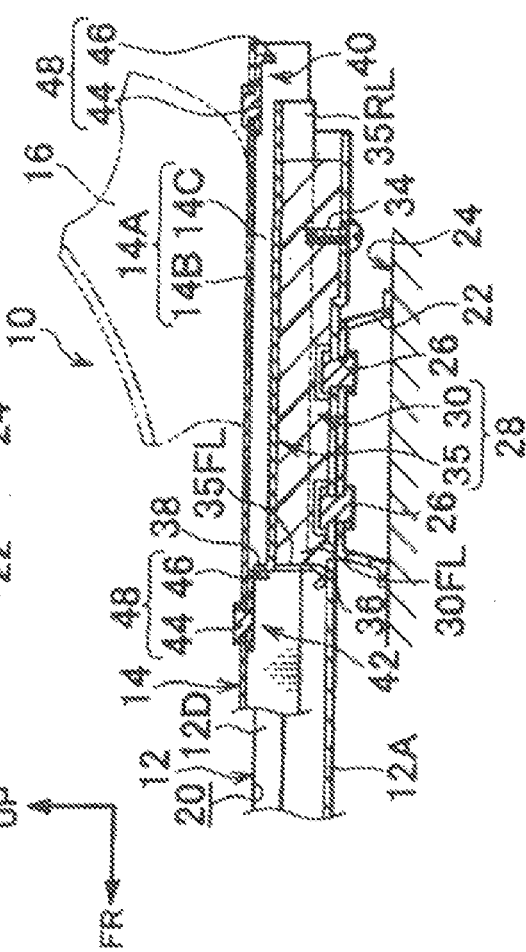

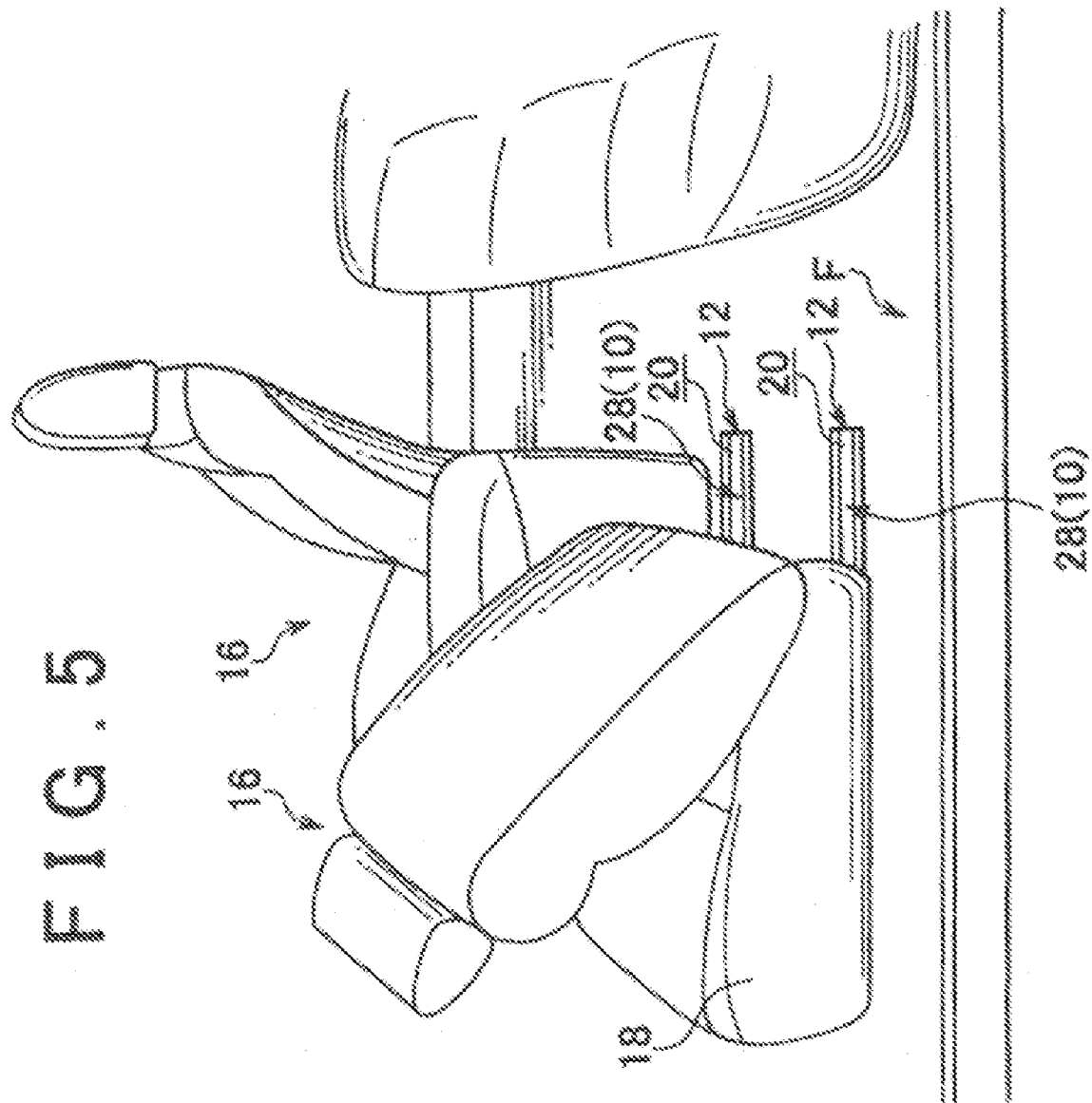
FIG. 5
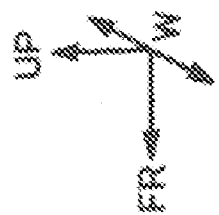

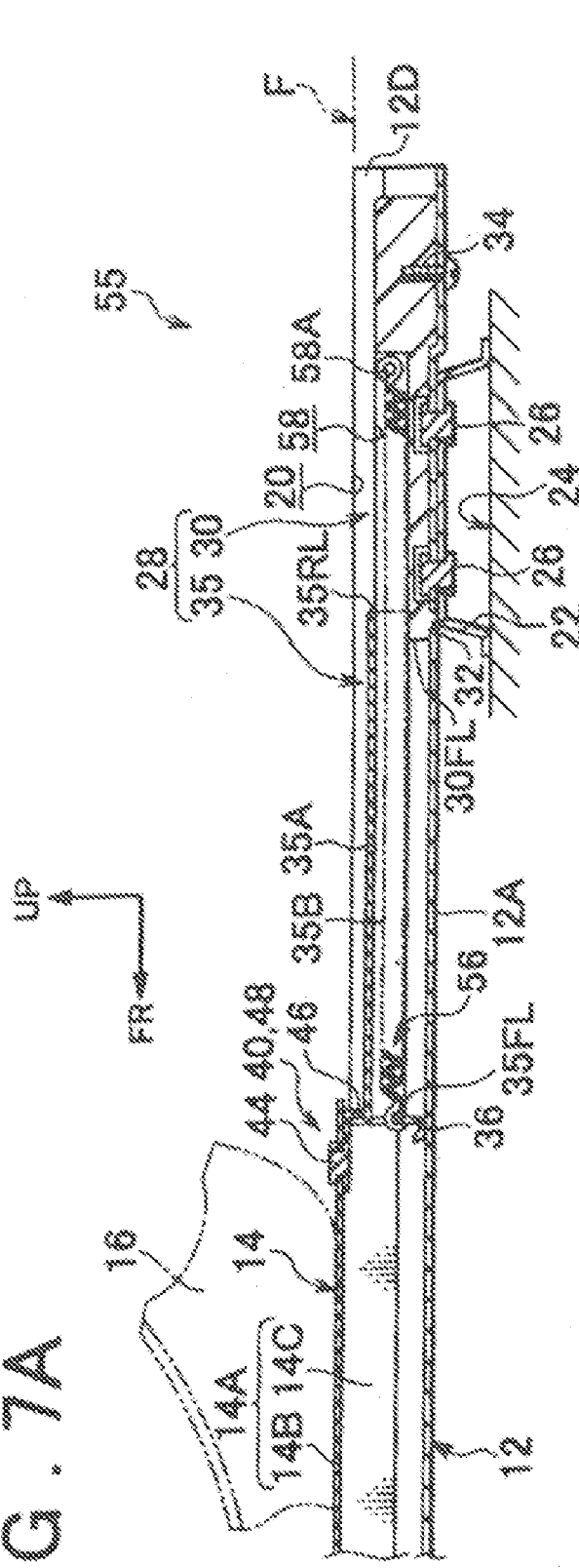
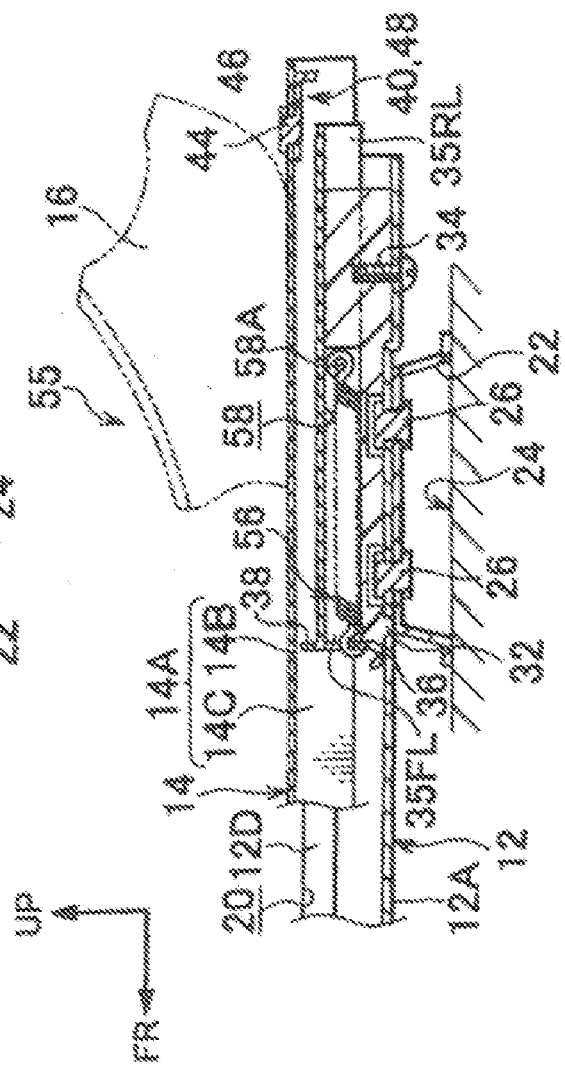

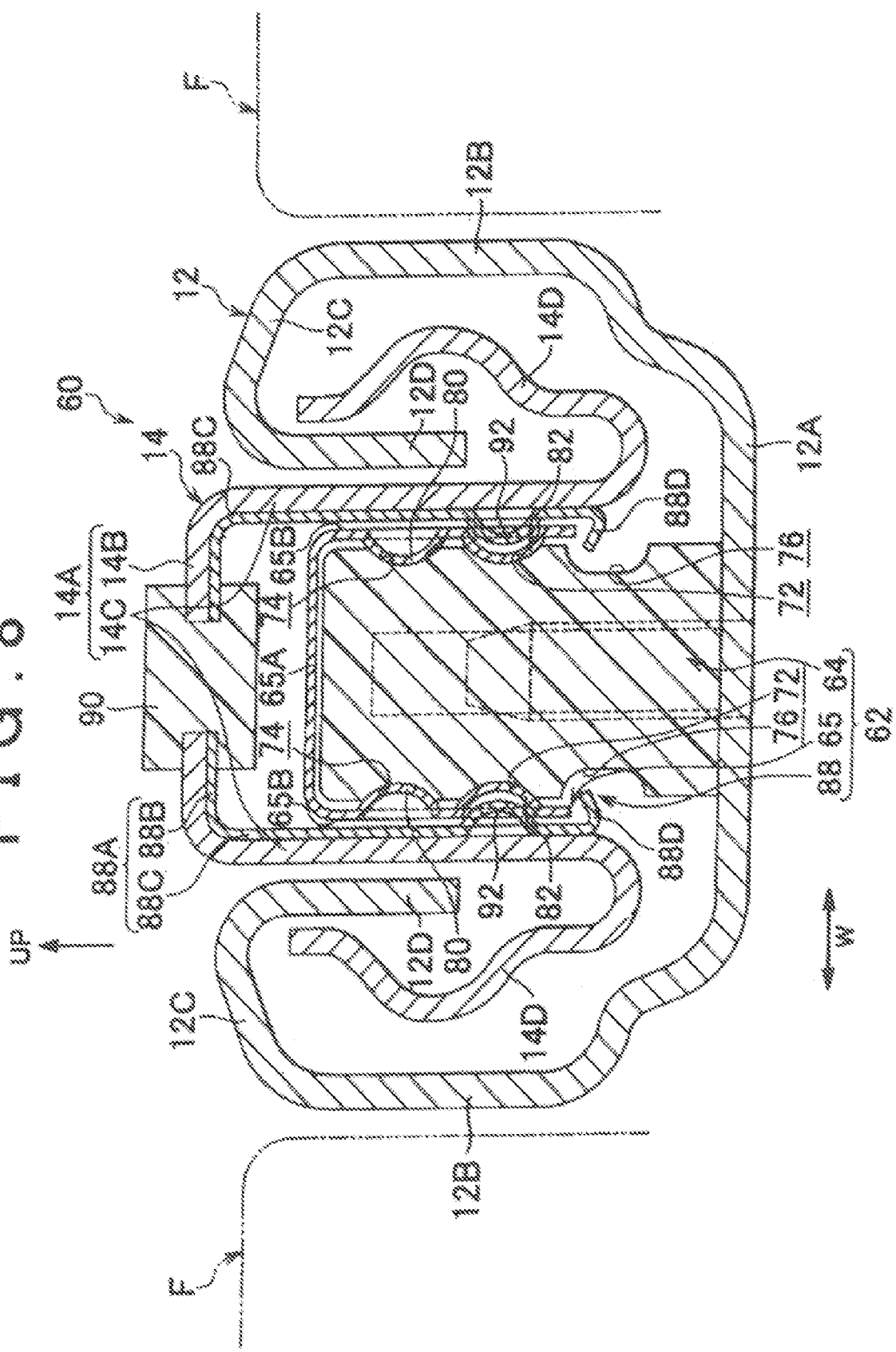

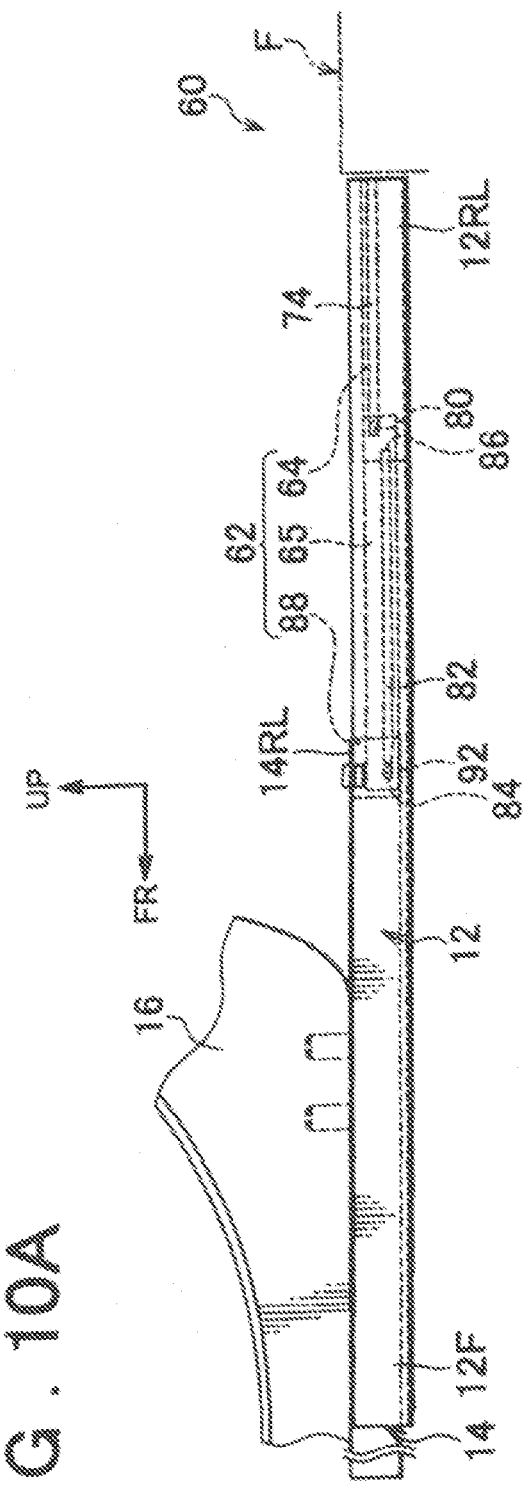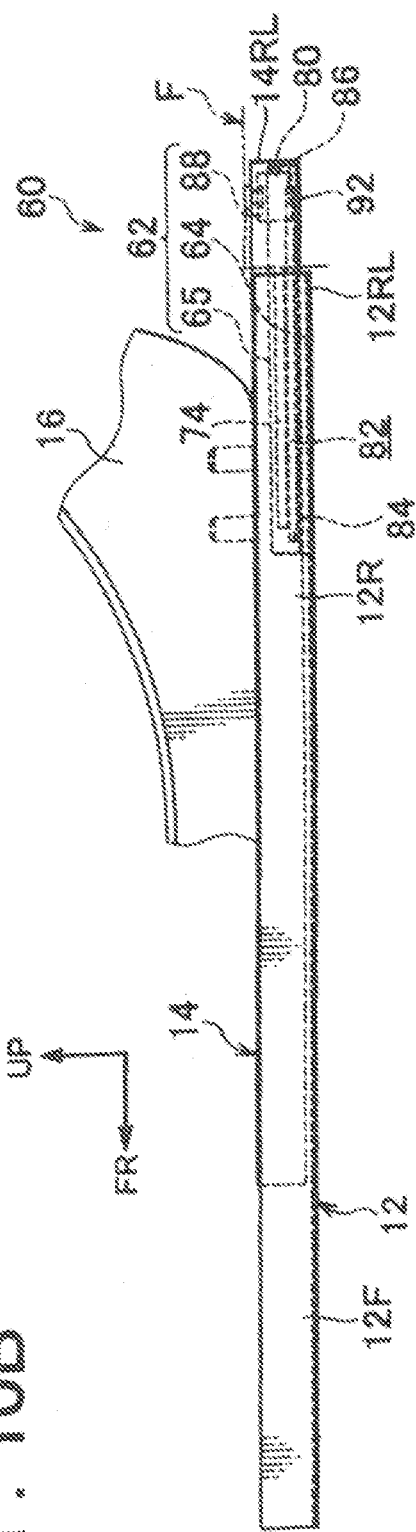
FIG. 10A
FIG. 10B

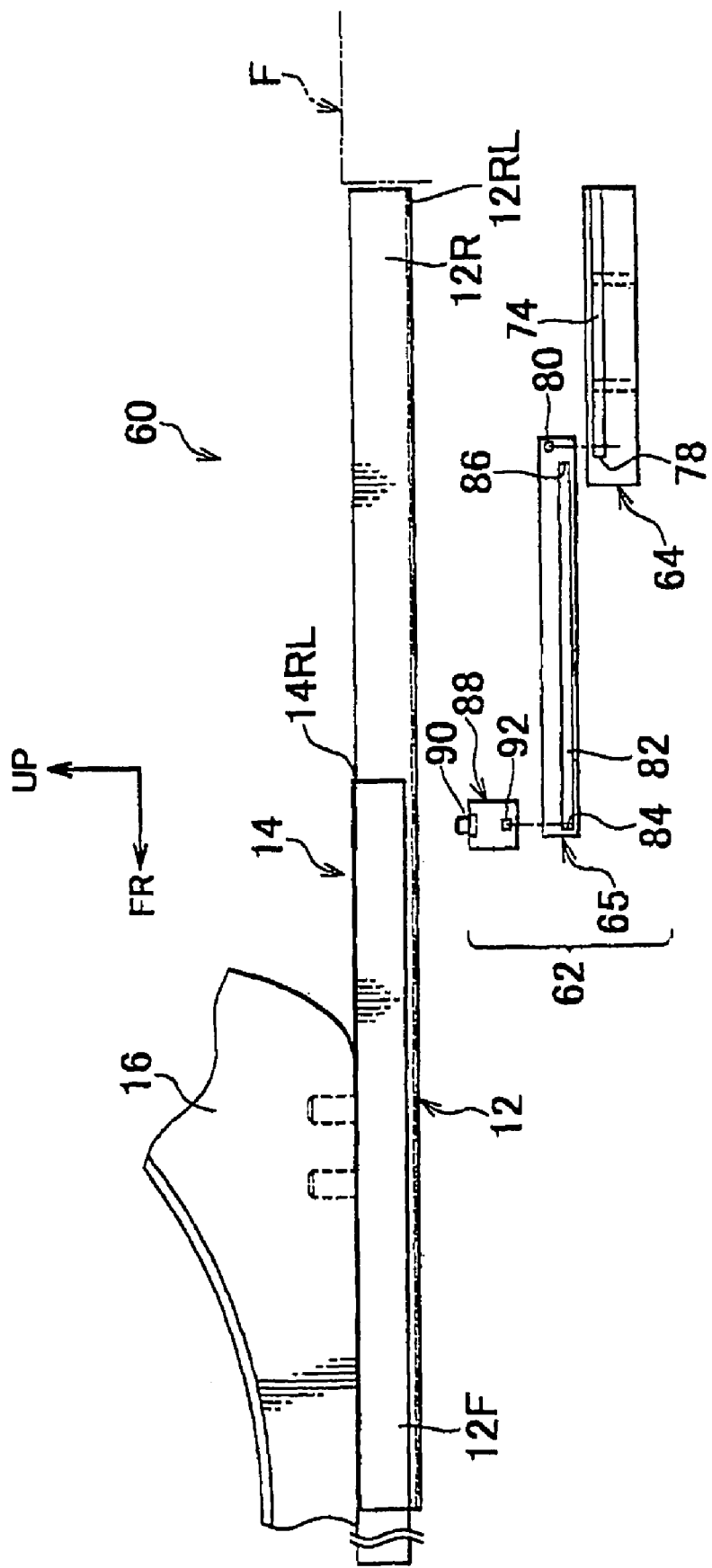

VEHICLE SEAT RAIL ASSEMBLY

CROSS-REFERENCE TO RELATED APPLICATIONS

This application is the U.S. national phase of PCT/IB2008/002098 filed Aug. 8, 2008, which claims priority of Japanese Patent Application No. 2007-209535 filed Aug. 10, 2007.

BACKGROUND OF THE INVENTION

1. Field of the Invention

The present invention relates to a vehicle seat rail assembly that enables the supported position of a vehicle seat to be adjusted relative to the vehicle body.

2. Description of the Related Art

A expandable-contractible slide rail cover having an inner cover and an outer cover connected to each other for longitudinal sliding movement and configured to cover an upper rail from above so as to cover the upward opening of a lower rail is known (see Japanese Utility Model No. 2550172, for example).

However, the cover of the related art, which is configured to cover the lower rail from outside of the upper rail, tends to lead to an increase in the size of the seat rail assembly as a whole.

SUMMARY OF THE INVENTION

The present invention provides a vehicle seat rail assembly that closes the groove portion of a lower rail with a compact configuration.

A vehicle seat rail assembly according to one aspect of the present invention includes: a lower rail having a groove portion that extends in the longitudinal direction of a vehicle body and that opens upward in the vertical direction of a vehicle body and adapted to be supported stationary relative to the vehicle body; an upper rail adapted to be attached to a vehicle seat and guided by the lower rail for sliding movement in the longitudinal direction of the lower rail; a stationary closing member disposed between a pair of groove walls that define the groove portion of the lower rail and adapted to be supported stationary relative to the vehicle body; and a movable closing member disposed between the paired groove walls of the lower rail and supported to slide in the longitudinal direction of the lower rail relative to the lower rail or the stationary closing member.

With the vehicle seat rail assembly according to this aspect, the upper rail may slide with respect to the lower rail to adjust the position of the seat relative to the vehicle body. Because the stationary closing member and the movable closing member are disposed between the paired groove walls of the lower rail, that part of the groove portion of the lower rail in which the stationary closing member and the movable closing member are provided is closed. That is, that part of the groove portion as an upward opening of the lower rail into which the upper rail does not extend, may be closed by the stationary closing member and the movable closing member disposed between the paired groove walls. The stationary closing member and the movable closing member, which are disposed between the paired groove walls of the lower rail, does not increase the size of the seat rail assembly at least in the lateral direction.

As described above, with the vehicle seat rail assembly according to this aspect, the groove portion of the lower rail can be closed with a compact configuration.

In the vehicle seat rail assembly according to this aspect, the stationary closing member may be located on the side of a first limit of movement of the upper rail relative to the lower rail, and the movable closing member may be disposed for sliding movement relative to the stationary closing member such that the amount of overlap of the movable closing member with the stationary closing member in the longitudinal direction of the lower rail when the upper rail is located at the first limit of movement is greater than that when the upper rail is located at a second limit of movement opposite the first limit of movement.

Then, the range (length) of the closed part of the groove portion may be changed depending on the position of the upper rail relative to the lower rail by changing the amount of overlap of the movable closing member with the stationary closing member (by expanding and contracting the closing means constituted of the movable closing member and the stationary closing member).

The stationary closing member and the movable closing member may be arranged to move back and forth relative to a space in the upper rail when the upper rail slides relative to the lower rail.

Then, because the stationary closing member and the movable closing member moves back and forth relative to the space in the upper rail when the upper rail slides relative to the lower rail, the upper rail is prevented from interfering with the stationary closing member and the movable closing member. That is, the upper rail is allowed to slide relative to the lower rail between limits of movement spaced apart in the longitudinal direction of the lower rail.

The upper rail may have a first direction movement engaging portion that engages the movable closing member when the upper rail slides relative to the lower rail in a first direction along the longitudinal direction of the lower rail.

Then, when the upper rail slides relative to the lower rail in a first direction along the longitudinal direction of the lower rail, the first direction movement engaging portion is engaged with the movable closing member and the movable closing member is moved relative to the lower rail in the first direction along the longitudinal direction of the lower rail. Thus, the range of the lower rail groove portion closed by the movable closing member (closing means) may be moved in the first direction along the longitudinal direction of the lower rail depending on the change in position of the upper rail relative to the lower rail in the first direction along the longitudinal direction of the lower rail.

The upper rail may have a second direction movement engaging portion that engages the movable closing member when the upper rail slides relative to the lower rail in a second direction opposite the first direction along the longitudinal direction of the lower rail.

Then, when the upper rail slides relative to the lower rail in a second direction opposite the first direction along the longitudinal direction of the lower rail, the second direction movement engaging portion engages with the movable closing member and the movable closing member is moved relative to the lower rail in the second direction along the longitudinal direction of the lower rail. Thus, the range of the lower rail groove portion closed by the movable closing member (closing means) may be moved in the second direction along the longitudinal direction of the lower rail depending on the change in position of the upper rail relative to the lower rail in the second direction along the longitudinal direction of the lower rail.

The stationary closing member may be formed separately from the lower rail.

Then, there is no need to form steps in longitudinal intermediate portion of the lower rail, and a lower rail with improved linearity can be formed. Also, since an optimum material for the stationary closing member can be selected, the resistance to wear and the appearance can be improved.

The stationary closing member may be formed integrally with the lower rail.

Then, the number of parts can be reduced and the production process can be facilitated.

The lower rail may be embedded in a floor of the vehicle.

Then, because the lower rail is embedded in the floor, the floor may be flat. Because the stationary closing member and the movable closing member are disposed between the paired groove walls of the lower rail, the groove portion of the lower rail may be closed from inside in the structure in which the lower rail is embedded in the floor.

As described in the foregoing, the vehicle seat rail assembly according to the present invention is able to close the groove portion of the lower rail with a compact configuration.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 3A and 3B are views that illustrate the vehicle seat rail assembly according to the first embodiment of the present invention, wherein FIG. 3A is a sectional side view of the vehicle seat rail assembly when the vehicle seat, is in its front-most position and FIG. 3B is a sectional side view of the vehicle seat rail assembly when the vehicle seat is in its rearmost position;

FIGS. 4A and 4B are views that illustrate the vehicle seat, the longitudinal position of which is adjusted by the vehicle seat rail assembly according to the first embodiment of the present invention, wherein FIG. 4A is a side view of the vehicle seat in its front-most position and FIG. 4B is a side view of the vehicle seat in its rearmost position;

FIG. 5 is a perspective view that illustrates the inside of the cabin of the vehicle to which the vehicle seat rail assembly according to the first embodiment of the present invention is applied;

FIGS. 7A and 7B are views that illustrate a vehicle seat rail assembly according to a second embodiment of the present invention, wherein FIG. 7A is a sectional side view of the vehicle seat rail assembly when the vehicle seat is in its front-most position and FIG. 7B is a sectional side view of the vehicle seat rail assembly when the vehicle seat is in its rearmost position;

FIG. 8 is a cross-sectional view of a vehicle seat rail assembly according to a third embodiment of the present invention taken perpendicular to the longitudinal direction thereof;

FIGS. 10A and 10B are views that illustrate the vehicle seat rail assembly according to the third embodiment of the present invention, wherein FIG. 10A is a side view of the vehicle seat rail assembly when the vehicle seat is in its front-most position and FIG. 10B is a side view of the vehicle seat rail assembly when the vehicle seat is in its rearmost position;

FIG. 12 is an exploded side view that illustrates the positions of components of the vehicle seat rail assembly according to the third embodiment of the present invention in the longitudinal direction of the vehicle when the vehicle seat is in its front-most position.

DETAILED DESCRIPTION OF EMBODIMENTS

Figure 1:
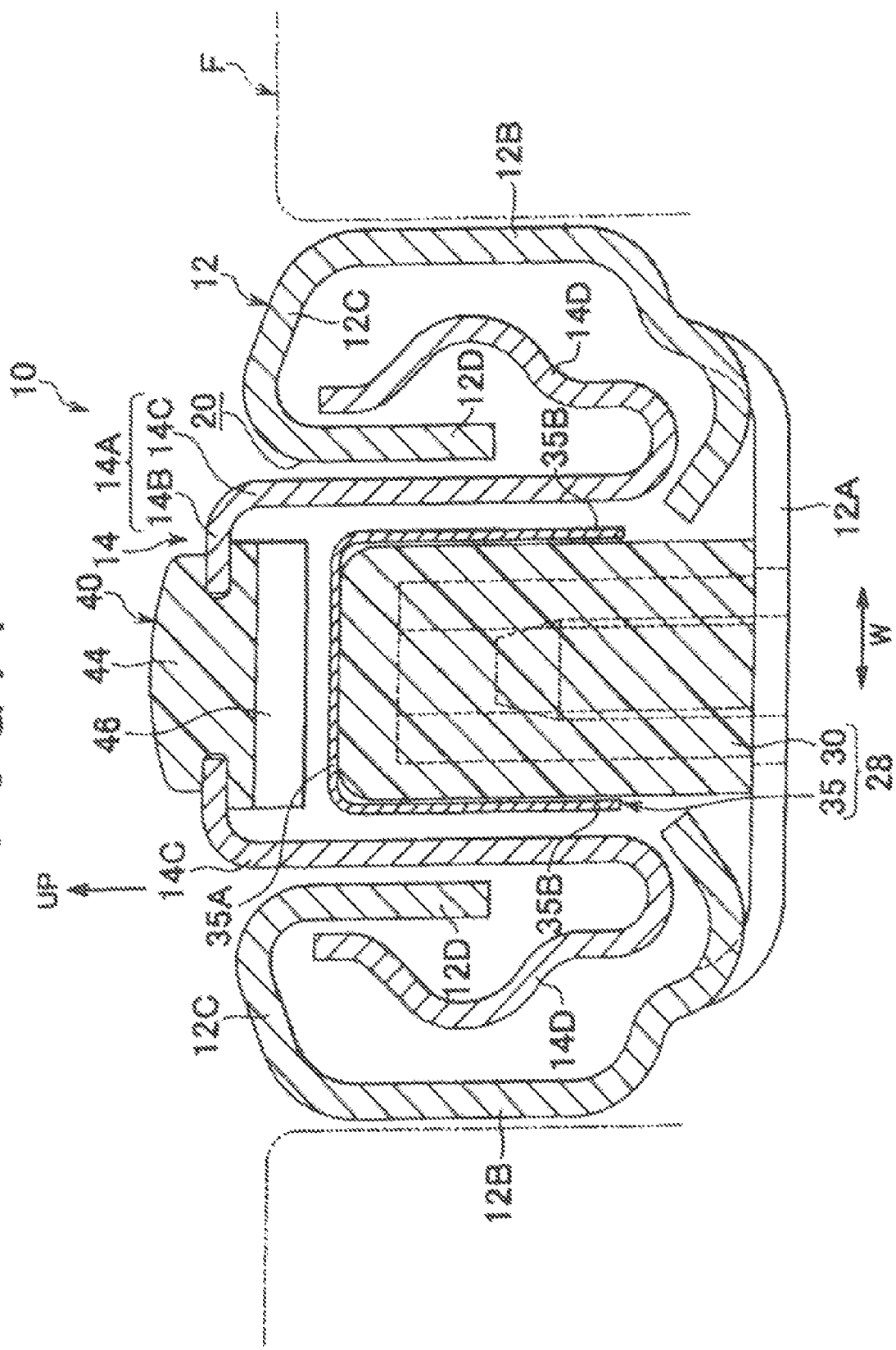
FIG. 1 is a cross-sectional view of a vehicle seat rail assembly according to a first embodiment of the present invention taken perpendicular to the longitudinal direction thereof.

A vehicle seat rail assembly 10 according to a first embodiment of the present invention will be described below with reference to FIG. 1 to FIG. 5. The arrow FR, arrow UP and arrow W shown in the drawings point in the forward direction (traveling direction), upward direction and lateral direction, respectively, of the vehicle equipped with the vehicle seat rail assembly 10.

Figure 4A:
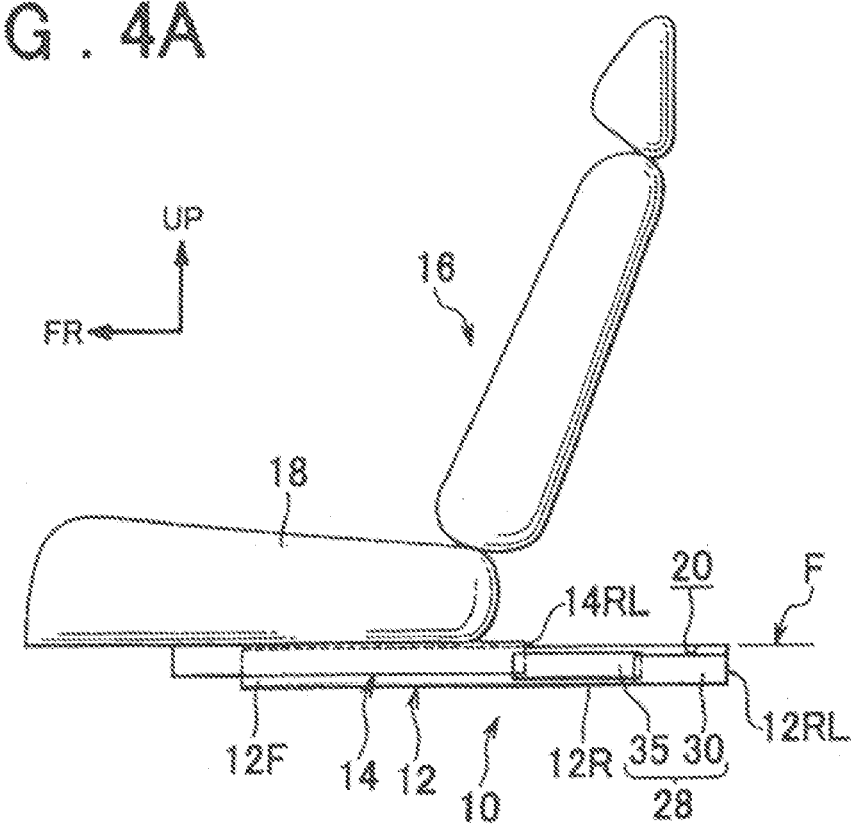
Figure 4B:
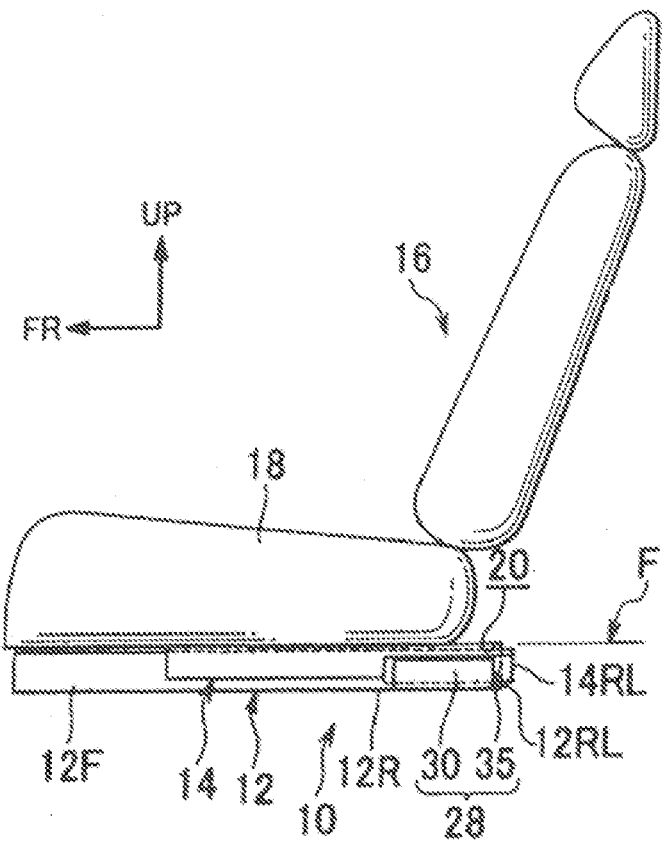

FIG. 4A and FIG. 4B are schematic side views that illustrate the general overall configuration of the vehicle seat rail assembly 10. As shown in the drawings, the vehicle seat rail assembly 10 has a lower rail 12 and an upper rail 14. The lower rail 12 extends in the longitudinal direction of the vehicle and is fixedly supported on the vehicle floor F. The lateral direction of the lower rail 12 coincides with the lateral direction of the vehicle. The upper rail 14 extends in the longitudinal direction of the vehicle and is fixed to a lower part of a seat cushion 18 of a vehicle seat 16. The upper rail 14 is supported for sliding movement in the longitudinal direction of the vehicle relative to the lower rail 12.

More specifically, the lower rail 12 has a bottom plate 12A secured to the vehicle body, a pair of outer walls 12B that extend upward from the opposite lateral ends of the bottom plate 12A, a pair of upper walls 12C extending laterally inward from the upper ends of the paired outer walls 12B, and a pair of inner walls 12D extending downward in the vertical direction of the vehicle body from the inner ends of the paired upper walls 12C as shown in FIG. 1. Therefore, the lower rail 12 has a guide groove 20 as a groove portion formed between the paired inner walls 12D and opening upward in the vertical direction of the vehicle body. The paired inner walls 12D may be regarded as a pair of groove walls in the present invention.

The lower rail 12 is secured to a vehicle body frame 24 (a cross member, for example) via brackets 22 as shown in FIG. 3A. More specifically, the bottom plate portion 12A of the lower rail 12 is secured to the bracket 22 by swage members 26.

The upper rail 14 has an upper rail main body 14A disposed between the paired inner walls 12D of the lower rail 12, that is, received in the guide groove 20. The upper rail main body 14A has an upper wall 14B secured to the seat cushion 18 of the vehicle seat 16, and a pair of side walls 14C extending downward in the vertical direction of the vehicle body from opposite lateral ends of the upper wall 14B, and therefore has a generally U-shaped cross-section opening downward in the vertical direction of the vehicle body as a whole. The paired side walls 14C of the upper, rail main body 14A are guided (and held against lateral displacement) by the paired inner walls 12D of the lower rail 12 when the upper rail 14 slides in the longitudinal direction of the vehicle relative to the lower rail 12.

The upper rail 14 also has a pair of folded-back portions 14D folded upward in the vertical direction of the vehicle body from the lower ends of the paired side walls 14C. Each of the folded-back portions 14D is received between the corresponding outer wall 12B and inner wall 12D of the lower rail 12. This prevents the upper rail 14 (the vehicle seat 16) from being lifted off upward in the vertical direction of the vehicle body.

A slide lock mechanism or electric driving mechanism (not shown) may be provided between the lower rail 12 and the upper rail 14. In this embodiment, the major portion of the slide lock mechanism or electric driving mechanism is housed in the lower rail 12. In the case of a manually-operated vehicle seat rail assembly 10, the upper rail 14 is allowed to slide in the longitudinal direction of the vehicle relative to the lower rail 12 when the slide lock mechanism is unlocked, and is inhibited from sliding in the longitudinal direction of the vehicle relative to the lower rail 12 when the slide lock mechanism is locked. In the case of an electrically-operated vehicle seat rail assembly 10, when an operating switch is operated, the upper rail 14 moves relative to the lower rail 12 according to the direction in which the operating switch is moved and held in the position where it is stopped by the self-locking function of a ball screw or the like of the electric driving mechanism. As a result, the position of the vehicle seat 16 in the longitudinal direction of the vehicle relative to the vehicle floor F is adjusted by the vehicle seat rail assembly 10.

As shown in FIG. 1 and FIG. 4, the lower rail 12 is embedded in the vehicle floor F. That is, the lower rail 12 is disposed such that the paired upper walls 12C are generally flush with the upper surface of the vehicle floor F. In this state, the upper wall 14B of the upper rail 14 is slightly raised upward from the vehicle floor F.

In the vehicle seat rail assembly 10, a rear part 12R of the lower rail 12 is exposed in the vehicle floor F (is not covered by the upper rail 14 and the vehicle seat 16 from above) when the vehicle seat 16 is in its front-most position (forward movement limit) relative to the vehicle floor F as shown in FIG. 4A. In contrast, the entire portion (or at least a front part 12F) of the lower rail 12 is under the vehicle seat 16 (covered by the vehicle seat 16) when the vehicle seat 16 is in its rearmost position (backward movement limit) relative to the vehicle floor F as shown in FIG. 4B.

The vehicle seat rail assembly 10 is provided with a cover mechanism 28 operable to close that part of the guide groove 20 in the rear part 12R of the lower rail 12. As shown in FIG. 4A, the cover mechanism 28 is configured to close at least that part of the guide groove 20 between the rear end 12RL of the lower rail 12 and the rear end 14RL of the upper rail 14. Also, as shown in FIG. 1, the cover mechanism 28 is disposed in the guide groove 20 and configured to close the guide groove 20. A more detailed description is provided below.

Figure 2:
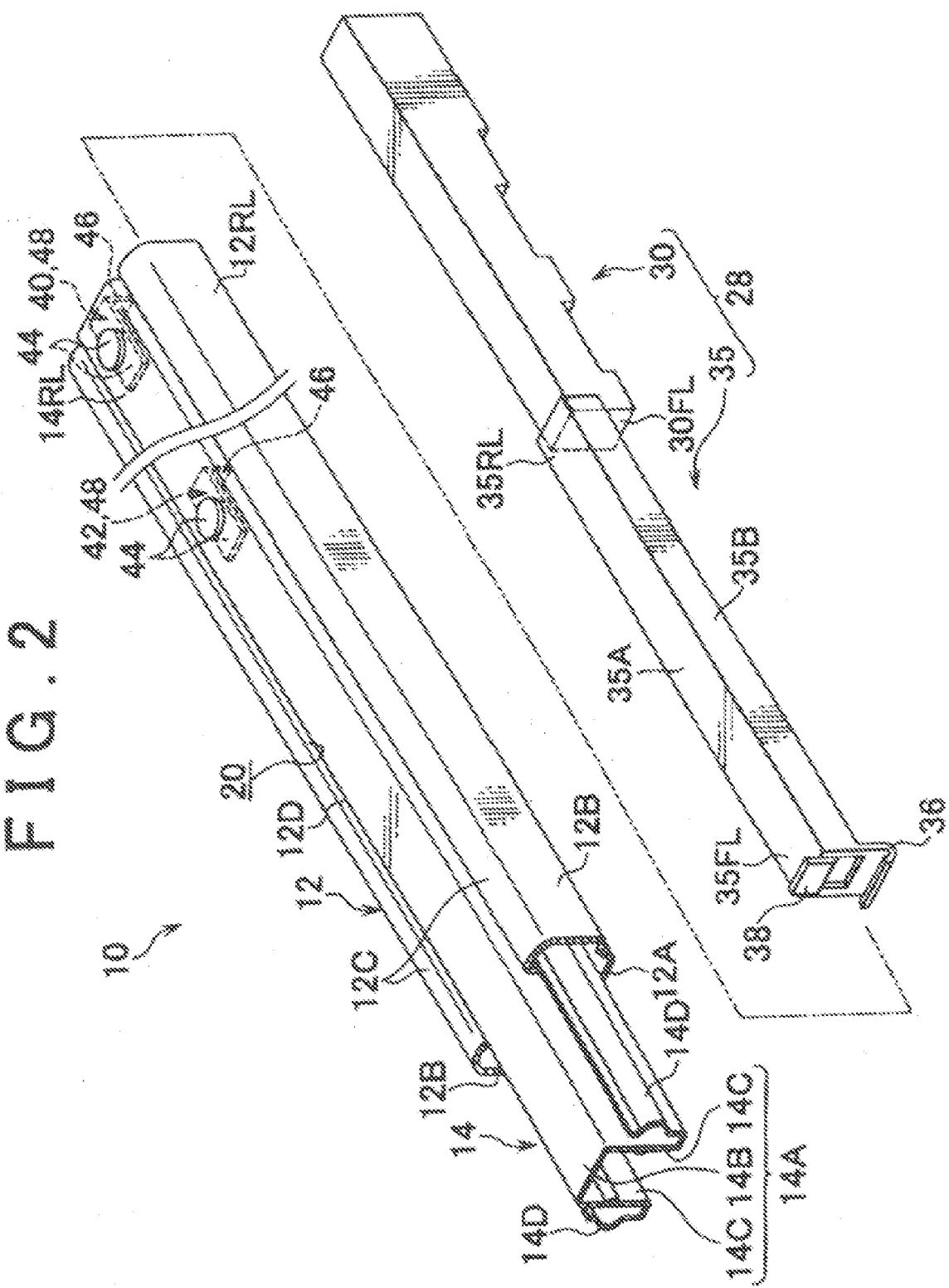
FIG. 2 is a perspective view, partially exploded, of the vehicle seat rail assembly according to the first embodiment of the present invention.

As shown in FIG. 1 to FIG. 3, the cover mechanism 28 has a stationary cover 30 as a stationary closing member held against displacement relative to the lower rail 12. The stationary cover 30 is of a generally rectangular block shape that extends in the longitudinal direction of the vehicle, and disposed in the portion of the guide groove 20 in the rear part 12R of the lower rail 12. As shown in FIG. 3A, the stationary cover 30 is secured at its rear part to the bottom plate portion 12A of the lower rail 12 by a bolt 34 with a positioning projection 32 in the vicinity of its front end engaged with the bottom plate portion 12A of the lower rail 12. The stationary cover 30 may be formed by injection molding of a resin material or the like, for example.

The cover mechanism 28 also has a movable cover 35 as a movable closing member slidable in the longitudinal direction of the vehicle relative to the stationary cover 30. The movable cover 35 extends in the longitudinal direction of the vehicle, and has a generally U-shaped cross-section that opens downward in the vertical direction of the vehicle body. The movable cover 35 is longer than the stationary cover 30, and covers the stationary cover 30 from above in the vertical direction of the vehicle body.

More specifically, the movable cover 35 has an upper wall 35A operable to close the guide groove 20, and a pair of guide walls 35B that extend downward in the vertical direction of the vehicle body from the opposite lateral ends of the upper wall 35A as shown in FIG. 1. A sliding piece 36 protrudes downward in the vertical direction of the vehicle body from the front end 35FL of the movable cover 35. The lower end of the sliding piece 36 is slidably mounted on the bottom plate portion 12A of the lower rail 12. The paired guide walls 35B of the movable cover 35 are guided (and held against lateral displacement) by the stationary cover 30 and the movable cover 35 is held in a fixed attitude relative to the lower rail 12 by the contact between the sliding piece 36 and the bottom plate portion 12A when the movable cover 35 slides in the longitudinal direction of the vehicle relative to the stationary cover 30.

As shown in FIG. 1, the stationary cover 30 and the movable cover 35 of the cover mechanism 28 are located in the upper rail main body 14A (between the paired side walls 14C) of the upper rail 14 as viewed from the front. Therefore, the cover mechanism 28 is movable back and forth relative to the upper rail 14 slidable in the longitudinal direction of the vehicle relative to the lower rail 12, in other words, does not interfere with the upper rail 14.

An engaged piece 38 as an engaged portion protrudes upward in the vertical direction of the vehicle body from the front end 35FL of the movable cover 35. When the engaged piece 38 is engaged with the upper rail 14, the movable cover 35 is driven by the upper rail 14. More specifically, the upper rail 14 has a forward engaging portion 40 as a first direction movement engaging portion or second direction movement engaging portion operable to drive the movable cover 35 forward in the longitudinal direction of the vehicle, and a rearward engaging portion 42 as a second direction movement engaging portion or first direction movement engaging portion operable to drive the movable cover 35 rearward in the longitudinal direction of the vehicle as shown in FIG. 3A.

In this embodiment, the forward engaging portion 40 and the rearward engaging portion 42 are formed by secured engaging members 48, each having a secured portion 44 and an engaging piece 46 that extends downward in the vertical direction of the vehicle body from the secured portion 44 at different positions on the upper rail 14. The engaging members 48 are secured to the upper wall 14B of the upper rail 14 by swaging the secured portions 44 against the upper wall 14B of the upper rail 14. The engaging piece 46 of the forward engaging portion 40 and the engaging piece 46 of the rearward engaging portion 42 are spaced apart a predetermined distance in the longitudinal direction of the vehicle. In this embodiment, the distance between the engaging piece 46 of the forward engaging portion 40 and the engaging piece 46 of the rearward engaging portion 42 is so determined that the upper rail main body 14A of the upper rail 14 covers generally the entire length of the movable cover 35 from above in the vertical direction of the vehicle body when the vehicle seat 16 is located in the rearmost position.

Accordingly, the covet mechanism 28 is configured such that, when the vehicle seat 16 is in the rearmost position, the movable cover 35 covers generally the entire length of the stationary cover 30 and the upper rail 14 covers generally the entire length of the movable cover 35 as described above as shown in FIG. 3B. Also, the cover mechanism 28 is configured such that, when the vehicle seat 16 is in the front-most position, that part of the guide groove 20 on the rear side of the upper rail 14 is closed by the movable cover 35 and the stationary cover 30 with the rear end 35RL of the movable cover 35 in overlapping relation with the front end 30FL of the stationary cover 30.

That is, the cover mechanism 28 is in a contracted state, in which the stationary cover 30 and the movable cover 35 overlap with each other over generally the entire lengths thereof and closes (fills) the guide groove 20, when the vehicle seat 16 is in the rearmost position and the lower rail 12 is hidden under the vehicle seat 16, and the cover mechanism 28 is in an expanded state in which the stationary cover 30 and the movable cover 35 slightly overlap with each other and closes that part of the guide groove 20 in the rear part 12R when the vehicle seat 16 is in the front-most position and the rear part 12R of the lower rail 12 is exposed.

In the vehicle seat rail assembly 10, when the vehicle seat 16 is in the rearmost position and the cover mechanism 28 is in the contracted state, the slide lock mechanism or electric driving mechanism (not shown) mentioned before is positioned right in front of the cover mechanism 28. In other words, the length (front end position) of the stationary cover 30 of the cover mechanism 28 is determined so as not to interfere with the slide lock mechanism or electric driving mechanism when the vehicle seat 16 is in the rearmost position, and that part of the guide groove 20 which cannot be closed by the stationary cover 30 is closed by the movable cover 35 having a slide structure when necessary.

In addition, because the engagement piece 46 of the forward engaging portion 40 and the engaging piece 46 of the rearward engaging portion 42 are spaced from each other in the cover mechanism 28 as described above, the movable cover 35 is located in different positions relative to the stationary cover 30 depending on whether the vehicle seat 16 is moved from a position on the front-most position side or a position on the rearmost position side between the front-most position and the rearmost position (position hysteresis function is provided). Therefore, the distance which the upper rail 14 may slide along the length of the lower rail 12 is greater in the vehicle seat rail assembly 10 than that in a configuration in which the movable cover 35 follows the upper rail 14.

The function of the first embodiment is next described.

In the vehicle seat rail assembly 10 configured as described above, when the vehicle seat 16 is moved from the front-most position shown in FIG. 3A toward the rearmost position shown in FIG. 3B, for example, the movable cover 35 remain in the position where it is when the vehicle seat 16 is in the front-most position until the engaging piece 46 of the rearward engaging portion 42 engages the engaged piece 38. When the engaging piece 46 of the rearward engaging portion 42, which moves rearward together with the upper rail 14, engages with the engaged piece 38, the engaged piece 38 is pushed by the engaging piece 46 of the rearward engaging portion 42 and the movable cover 35 slides rearward. When the vehicle seat 16 reaches the rearmost position, the movable cover 35 is prevented from further rearward movement. Thus, the upper rail 14 is not impeded from moving toward the position where it is located when the vehicle seat 16 is in the rearmost position (the moving stroke of the upper rail 14 is not limited) by the cover mechanism 28.

In the vehicle seat rail assembly 10, when the vehicle seat 16 is moved from the rearmost position toward the front-most position, for example, the movable cover 35 remains in position where it is when the vehicle seat 16 is in the rearmost position until the engaging piece 46 of the forward engaging portion 40 engages the engaged piece 38. When the engaging piece 46 of the forward engaging portion 40, which moves forward together with the upper rail 14, engages with the engaged piece 38, the engaged piece 38 is pushed by the engaging piece 46 of the forward engaging portion 40 and the movable cover 35 slides forward. When the vehicle seat 16 reaches the front-most position, the movable cover 35 is prevented from further forward movement. Therefore, the part of the guide groove 20 in the lower rail 12, which is exposed by the forward movement of the vehicle seat 16, is closed by the cover mechanism 28.

Because the vehicle seat rail assembly 10 has the cover mechanism 28, the part of the guide groove 20 in the rear part 12R of the lower rail 12 and behind the vehicle seat 16 (the upper rail 14) is closed by the cover mechanism 28. Therefore, even if the rear part 12R of the lower rail 12 is located in passage through which passengers enter and leave the vehicle as shown in FIG. 5, for example, the appearance is improved since the guide groove 20 is closed. Also, foreign objects are prevented from entering the guide groove 20.

In addition, because the cover mechanism 28 is disposed in the guide groove 20, that is, between the paired inner walls 12D of the lower rail 12 in the vehicle seat rail assembly 10, the guide groove 20 may be closed as described above with a more compact configuration as compared to a configuration in which a cover mechanism operable to cover the lower rail from outside is provided. In addition, because the cover mechanism 28 is disposed in the upper rail main body 14A of the upper rail 14 in the vehicle seat rail assembly 10, the cover mechanism 28 can close the guide groove 20 without interfering with the upper rail 14.

Moreover, because the cover mechanism 28 is disposed in the guide groove 20 in the vehicle seat, rail assembly 10, the vehicle seat rail assembly 10 may be suitably applied to a configuration in which the lower rail 12 is embedded in the vehicle floor F. That is, when a movable part (corresponding to the movable cover 35) is disposed outside the lower rail 12, it is necessary to provide a space in which the movable part can move (form projections and slots, for example) to bury the lower rail 12 in the vehicle floor F. The vehicle seat rail assembly 10 has no such limitations and can be assembled in the vehicle floor F easily. Also, because the movable cover 35 is disposed in the guide groove 20, objects on the vehicle floor F are prevented from interfering with the movement of the movable cover 35.

Also, in the vehicle seat rail assembly 10, because the upper rail 14 has the forward engaging portion 40, the part of the lower rail 12 that is exposed from under the upper rail 14 as the upper rail 14 moves forward is covered by the movable cover 35. In addition, in the vehicle seat rail assembly 10, because the upper rail 14 has the rearward engaging portion 42, when the upper rail 14 moves rearward, the movable cover 35 of the cover mechanism 28 is moved rearward without interference of the slide lock mechanism or electric driving mechanism, which follows the upper rail 14, with the cover mechanism 28.

Figure 6:
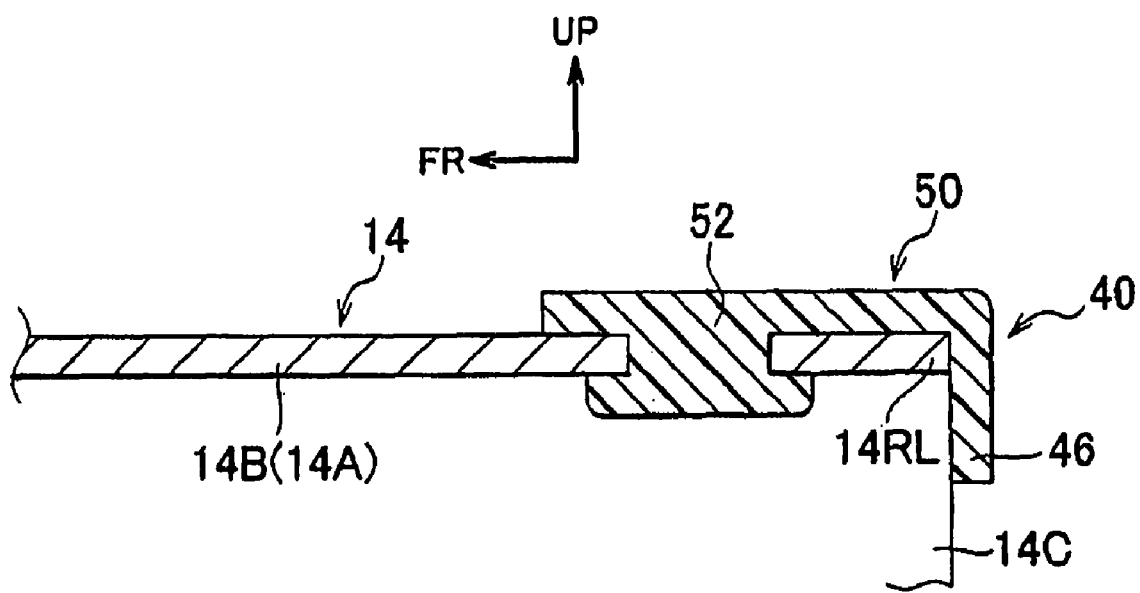
FIG. 6 is a sectional side view that illustrates a modification of an engagement member of the vehicle seat rail assembly according to the first embodiment of the present invention.

While an example in which an engaging member 48 having a securing portion 44 secured to the lower side of the upper rail 14 (the upper wall 14B) is used as the forward engaging portion 40 is shown in the first embodiment, a modification as shown FIG. 6, for example, may also be employed. An engaging member 50 according to the modification has a securing portion 52 secured to the upper side of the upper wall 14B and an engaging piece 46 extending downward from the rear end of the securing portion 52. In this case, the base portion of the engaging piece 46 of the engaging member 50 also functions as a cap that covers the rear end 14RL of the upper rail 14.

Other embodiments of the present invention are described below. The components and parts constructed similarly to those of the first embodiment or the configurations described before are basically designated by the same reference numerals as those used in the description of the first embodiment or the configurations described before and their description is omitted.

A vehicle seat rail assembly 55 according to a second embodiment of the present invention is shown in FIG. 7A and FIG. 7B, which are schematic sectional side views corresponding to FIG. 3A and FIG. 3B, respectively. As shown in the drawings, the vehicle seat rail assembly 55 differs from the vehicle seat rail assembly 10 according to the first embodiment in having a return spring 56 instead of the rearward engaging portion 42.

More specifically, the stationary cover 30 has a spring receiving recess 58 that receives the return spring 56, and the rear end of the return spring 56 is engaged with an engaging portion 58A provided in the vicinity of the rear end of the spring receiving recess 58. The front end of return spring 56 engages the front end 35FL of the movable cover 35.

The return spring 56 is an extension coil spring, and urges the movable cover 35 rearward in the longitudinal direction of the vehicle at least when the vehicle seat 16 is located in a position on the front side from the rearmost position. Thus, in the vehicle seat rail assembly 55, the engaged piece 38 and the engaging piece 46 of the forward engaging portion 40 are in constant engagement with each other. Other features of the vehicle seat rail assembly 55 are the same as the corresponding features of the vehicle seat rail assembly 10.

Thus, the vehicle seat rail assembly 55 according to the second embodiment basically has the same functions and effects as the vehicle seat rail assembly 10 of the first embodiment except that the effect of moving the movable cover 35 rearward is produced by the return spring 56 instead of the rearward engagement portion 42.

As a modification of the second embodiment, the structure shown in FIG. 6, that is, a configuration in which the forward engagement portion 40 has the engagement member 50 instead of the engagement member 48 may be employed.

A vehicle seat rail assembly 60 according to a third embodiment of the present invention is next described with reference to FIG. 8 to FIG. 12.

Figure 9:
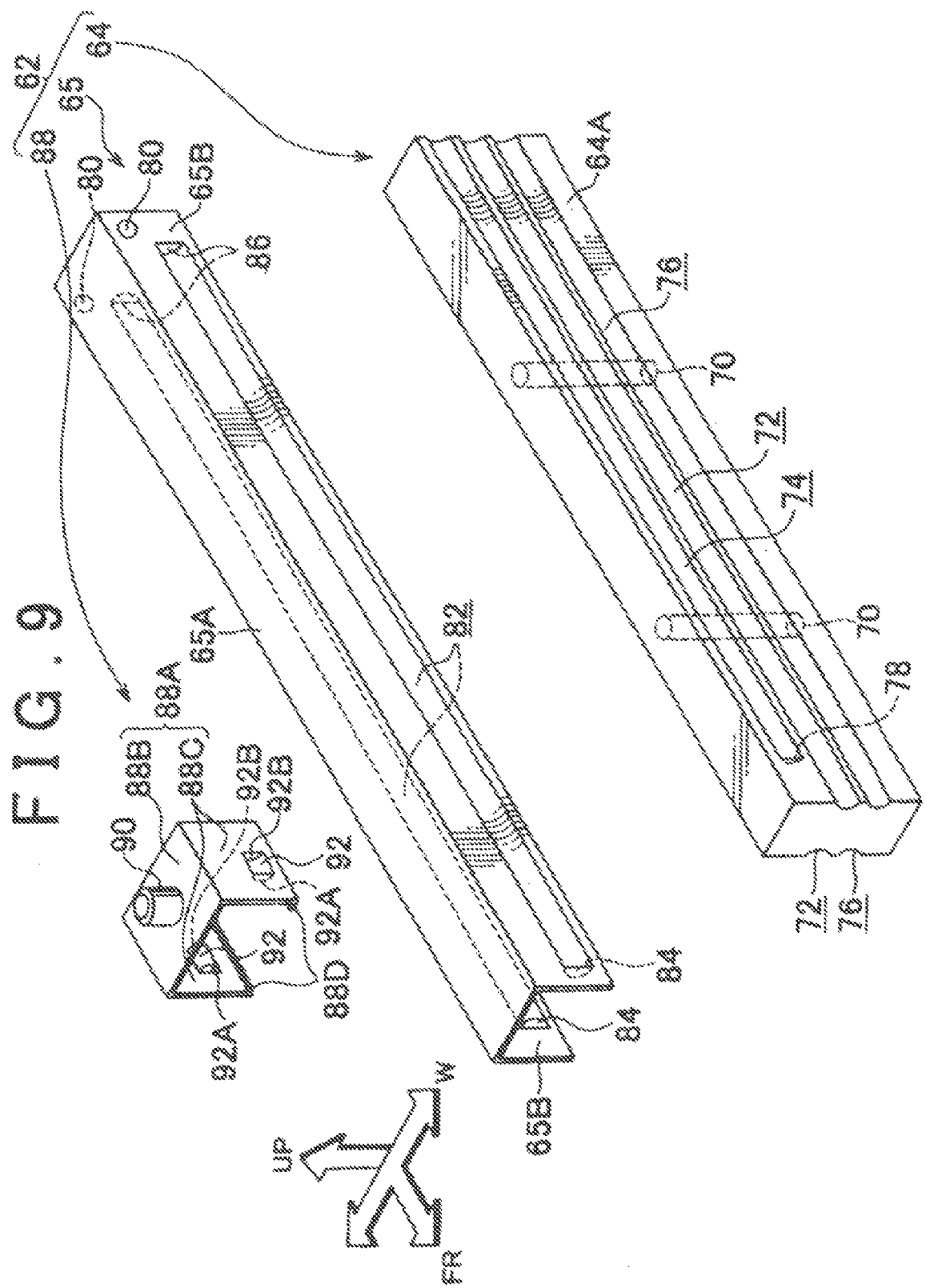
FIG. 9 is an exploded perspective view of a cover mechanism of the vehicle seat rail assembly according to the third embodiment of the present invention.

As shown in FIG. 8 to FIG. 10, the vehicle seat rail assembly 60 differs from the vehicle seat rail assembly 10 according to the first embodiment in having a cover mechanism 62 instead of the cover mechanism 28. The cover mechanism 62 is different from the cover mechanism 28, in which a gap is defined between the stationary cover 30 and the paired guide walls 35B of the movable cover 35, in that a movable cover 65 slidable relative to a stationary cover 64 is in close contact with the stationary cover 64 as shown in FIG. 8. A more detailed description is provided below.

The stationary cover 64 is of a generally rectangular block shape that extends in the longitudinal direction of the vehicle, and secured to the bottom plate portion 12A of the lower rail 12 by bolts (not shown) threaded through two bolt holes 70 shown in FIG. 9. The stationary cover 64 is different in shape from the stationary cover 30 in having side walls 64A each having an intermediate groove 72, an upper groove 74 and a lower groove 76 as shown in FIG. 8 and FIG. 9.

The paired intermediate grooves 72 and the paired lower grooves 76 open laterally outward along the entire length of the stationary cover 64, and the front and rear ends of the paired intermediate grooves 72 and the paired lower grooves 76 in the longitudinal direction of the vehicle open forward and rearward, respectively. In contrast, the front ends of the upper grooves 74 are closed by stopper walls 78, and the rear ends of the upper grooves 74 open rearward at the rear end of the stationary cover 64 as shown in FIG. 9. The stopper walls 78 are located in the vicinity of the front end of the stationary cover 64. Each upper groove 74 opens laterally outward along the entire length thereof.

The movable cover 65 has an upper wall 65A and a pair of guide walls 65B that extend downward in the vertical direction of the vehicle body from the opposite lateral ends of the upper wall 65A. As shown in FIG. 8 and FIG. 9, each of the paired guide walls 65B has a guided projection 80 that projects laterally inward from the rear end of the associated guide walls 65B. The movable cover 65 covers the stationary cover 64 from above, and each guided projection 80 is slidably received in the corresponding upper groove 74. Thus, when the movable cover 65 slides in the longitudinal direction of the vehicle relative to the stationary cover 64, the movable cover 65 is guided by the guided projections 80 and the upper grooves 74.

In this embodiment, the paired guide walls 65B function as plate springs that impel the guided projections 80 toward the bottoms of the upper grooves 74 (inward in the lateral direction of the stationary cover 64). Thus, the movable cover 65 is in close resilient engagement with the stationary cover 64 via the guided projections 80. In this embodiment, when the vehicle seat 16 (the upper rail 14) is located in a position within a specific range on the rearmost position side, each guided projection 80 is located in a position rearwardly beyond the rear end of the corresponding upper groove 74 (out of the upper groove 74).

Each of the paired guide walls 65B of the movable cover 65 has a support groove 82 that extends in the longitudinal direction of the vehicle and opening laterally outward. As shown in FIG. 8, the support grooves 82 are slidably received in the paired intermediate grooves 72 of the stationary cover 64. The intermediate grooves 72 are in resilient engagement with the support grooves 82 and therefore function as means for restricting lateral displacement of the movable cover 64. Also, as shown in FIG. 9, the front and rear ends of the support grooves 82 are closed by forward engaging walls 84 and rearward engaging walls 86 as engaged portions, respectively.

In addition, as shown in FIG. 8 and FIG. 9, the cover mechanism 62 has an engaging member 88 secured to the upper rail 14. The engaging member 88 has a main body portion 88A having a generally U-shape opening downward in the vertical direction of the vehicle body as viewed from the front. The main body portion 88A has an upper wall 88B and a swage portion 90 extending through the upper wall 14B of the upper rail 14, and the main body portion 88A is secured to the upper rail 14 by swaging of the swage portion 90.

Each wall of a pair of side walls 88C that extends downward in the vertical direction of the vehicle body from opposite lateral ends of the upper wall 88B of the engaging member 88 has an engaging projection 92 that protrudes laterally inward. The main body portion 88A of the engaging member 88 is placed on the movable cover 65 from above, and the engaging projections 92 are received in the support grooves 82 with a gap therebetween. As shown in FIG. 9, each of the engaging projections 92 has engaging walls 92A and 92B, which may engage with the forward engaging wall 84 and the rearward engaging wall 86, respectively, of the corresponding support groove 82 when the engaging member 88 slides.

With the above configuration, the movable cover 65 moves forward when the engaging walls 92A of the engaging projections 92 are moved forward in engagement with the forward engaging walls 84, and moves rearward when the engaging walls 92B of the engaging projections 92 are moved rearward in engagement with the rearward engaging walls 86. Therefore, in the third embodiment, the engaging walls 92A and the engaging walls 92B of the engaging projections 92 may be regarded as the first direction movement engaging portion and second direction movement engaging portion, respectively, of the present invention.

Also, the movable cover 65 is supported in a suspended manner by the upper rail 14 via the engaging member 88 with the engaging projections 92 received in front parts of the support grooves 82. Thus, the movable cover 65 does not include the sliding piece 36. A folded-back portion 88D is formed at the lower end of each of the paired side walls 88C, and the folded-back portions 88D prevent the engaging member 88 from being lifted upward off the movable cover 65. The folded-back portions 88D extend into the lower grooves 76 of the stationary cover 64. That is, the lower grooves 76 function as relieving recesses for the folded-back portions 88D.

Other features of the vehicle seat rail assembly 60 are the same as the corresponding features of the vehicle seat rail assembly 10 including the fact that the arrangement of the cover mechanism 62 (the stationary cover 64 and the movable cover 65) relative to the lower rail 12 is the same as the arrangement of the cover mechanism 28 relative to the lower rail 12, the relation with the slide lock mechanism or electric driving mechanism (not shown), and so on.

The function of the third embodiment will be described next.

Figure 11:
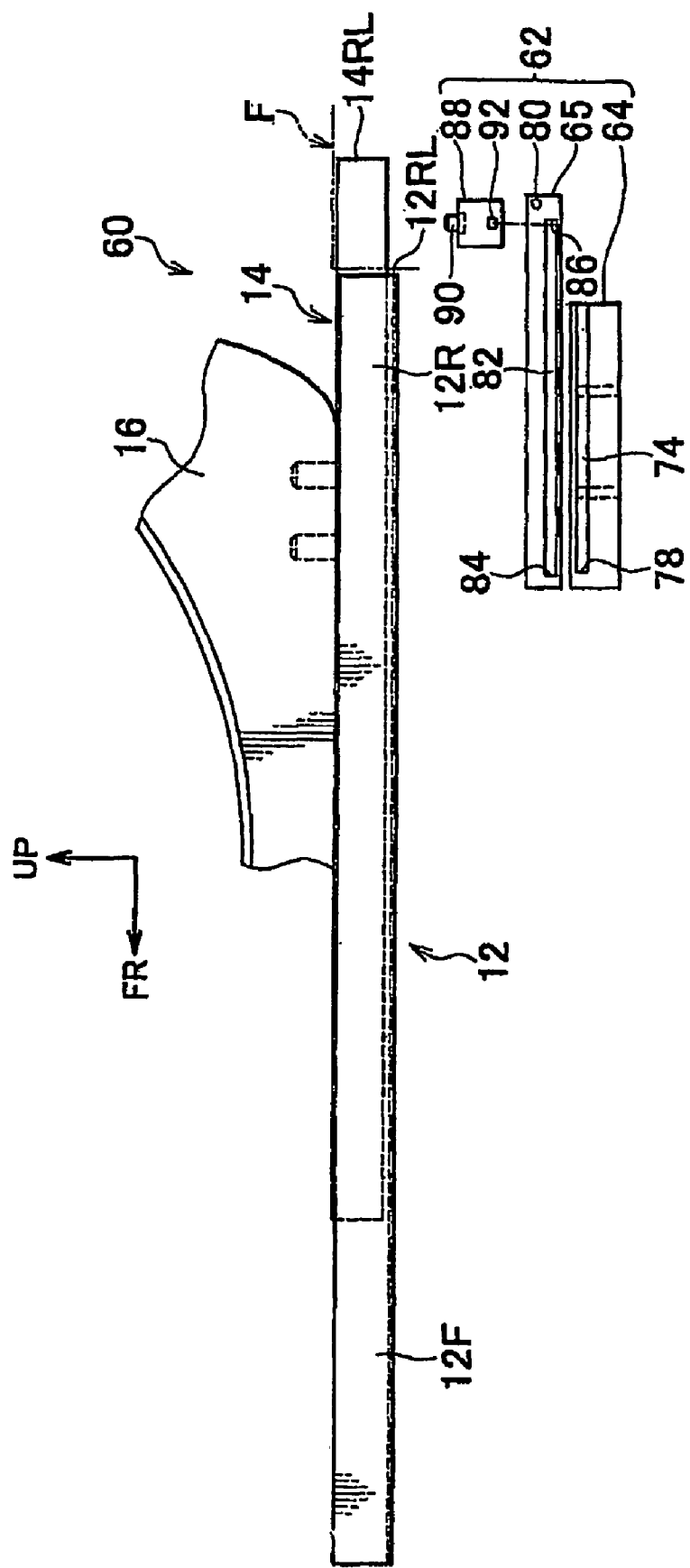
FIG. 11 is an exploded side view that illustrates the positions of components of the vehicle seat rail assembly according to the third embodiment of the present invention in the longitudinal direction of the vehicle when the vehicle seat is in its rearmost position.

In the vehicle seat rail assembly 60 configured as described above, when the vehicle seat 16 is moved from the front-most position shown in FIG. 10A toward the rearmost position shown in FIG. 10B, for example, the movable cover 65 stays in the position where it is when the vehicle seat 16 is in the frontmost position until the engaging projections 92 are engaged with the rearward engaging walls 86. When the engaging projections 92, which move rearward together with the upper rail 14, are engaged with the rearward engaging walls 86, the rearward engaging walls 86 are pushed by the engaging projections 92 and the movable cover 65 slides rearward. When the vehicle seat 16 reaches the rearmost position, the movable cover 35 is prevented from further rearward movement. Thus, the upper rail 14 is not impeded from moving toward the position where it is located when the vehicle seat 16 is in the rearmost position (the moving stroke of the upper rail 14 is not limited) by the cover mechanism 62. FIG. 11 is an exploded side view that schematically illustrates the positional relation of the constituent components in the longitudinal direction of the vehicle when the vehicle seat 16 is in the rearmost position.

In the vehicle seat rail assembly 60, when the vehicle seat 16 is moved from the rearmost position toward the front-most position, for example, the movable cover 65 stays in the position where it is when the vehicle seat 16 is in the rearmost position until the engaging projections 92 are engaged with the forward engaging walls 84. When the engaging projections 92, which move forward together with the upper rail 14, are engaged with the forward engaging walls 84, the forward engaging walls 84 are pushed by the engaging projections 92 and the movable cover 65 slides forward. When the vehicle seat 16 reaches the front-most position, the movable cover 35 is prevented from further forward movement. Therefore, the part of the guide groove 20 in the lower rail 12 that is exposed by the forward movement of the vehicle seat 16 is closed by the cover mechanism 62. FIG. 12 is an exploded side view that schematically illustrates the positional relation of the constituent components in the longitudinal direction of the vehicle when the vehicle seat 16 is in the front-most position.

The vehicle seat rail assembly 60, in which the guide groove 20 in the lower rail 12 is covered by the cover mechanism 62 disposed in the lower rail 12, basically has the same functions and provides the same effects as the vehicle seat rail assembly 10 of the first embodiment.

Also, because the guided projections 80 and the support grooves 82 of the movable cover 65 are in resilient engagement with the upper grooves 74 and the intermediate grooves 72, respectively, of the stationary cover 64 in the vehicle seat rail assembly 60, rattling of the movable cover 65 relative to the stationary cover 64 may be reduced in comparison to the vehicle seat rail assembly 10. Also, because the support grooves 82 are in resilient engagement with the intermediate grooves 72, the movable cover 65 is prevented from being lifted upward off the stationary cover 64. In addition; because gaps are defined laterally between the side walls 88C of the engaging member 88 and the guide walls 65B of the movable cover 65, the engaging member 88 and the movable cover 65 move smoothly relative to each other. When a lubricant (such as grease) is provided between the engaging projections 92 and the support grooves 82; because the lubricant is placed in the support grooves 82 in lower parts of the guide walls 65B, the lubricant is prevented from flowing out of the grooves and adhering to upper parts of the stationary cover 64 and the movable cover 65, whereby deterioration of appearance is prevented.

While an example in which the position of the vehicle seat 16 in the longitudinal direction of the vehicle is adjusted by the lower rail 12 and the upper rail 14 is shown in each of the above embodiments, the present invention is not limited thereto. For example, the present invention may be applied to a structure that adjusts the position of the vehicle seat 16 in the lateral direction of the vehicle.

While an example in which the stationary cover 30 or 64 is of a block shape and made of a resin material is shown in each of the above embodiments, the present invention is not limited thereto. For example, the stationary cover 30 or 64 may have a hollow or lightened structure formed by bending a plate material or injection molding. In this case, the movable cover 35 or 65 may be housed in the stationary cover 30 or 64.

In addition, while an example in which the lower rail 12 is embedded in the vehicle floor F is shown in each of the above embodiments, the present invention is not limited thereto. For example, the present invention may be applied to a structure in which the lower rail 12 is secured to the vehicle floor F.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A vehicle seat rail assembly comprising:
   a lower rail having a groove portion that extends in the longitudinal direction of a vehicle body and that opens upward in the vertical direction of the vehicle body and adapted to be supported stationary relative to the vehicle body;

an upper rail adapted to be attached to a vehicle seat and guided by the lower rail for sliding movement in the longitudinal direction of the lower rail;

a stationary closing member disposed between a pair of groove walls defining the groove portion of the lower rail and adapted to be supported stationary relative to the vehicle body; and a movable closing member disposed between the paired groove walls of the lower rail and supported for sliding movement in the longitudinal direction of the lower rail relative to at least one of the lower rail and the stationary closing member, the moveable closing member being movable with respect to the upper rail.

2. The vehicle seat rail assembly according to claim 1, wherein the stationary closing member is located on the side of a first limit of movement of the upper rail relative to the lower rail, and wherein the amount of overlap of the movable closing member with the stationary closing member in the longitudinal direction of the lower rail when the upper rail is located at the first limit of movement is greater than that when the upper rail is located at a second limit of movement opposite the first limit of movement.

3. The vehicle seat rail assembly according to claim 1, wherein the stationary closing member and the movable closing member move back and forth relative to a space in the upper rail when the upper rail slides relative to the lower rail.

4. The vehicle seat rail assembly according to claim 1, wherein the upper rail has a first direction movement engaging portion that engages the movable closing member when the upper rail slides relative to the lower rail in a first direction along the longitudinal direction of the lower rail.

5. The vehicle seat rail assembly according to claim 4, wherein the upper rail has a second direction movement engaging portion that engages the movable closing member when the upper rail slides relative to the lower rail in a second direction that is opposite the first direction along the longitudinal direction of the lower rail.

6. The vehicle seat rail assembly according to claim 4, further comprising:

a return spring, wherein the stationary closing member is provided with a spring receiving recess that receives the return spring and a first engaging portion, which is provided near the rear end of the spring receiving recess and with which one end of the return spring is engaged; and wherein the movable closing member is provided with a second engaging portion which is provided at the front end thereof and with which the other end of the return spring is engaged.

7. The vehicle seat rail assembly according to claim 1, wherein the stationary closing member is of a rectangular block shape that extends in the longitudinal direction of the vehicle, wherein the movable closing member extends in the longitudinal direction of the vehicle and has a generally U-shaped cross-section that opens downward in the vertical direction of the vehicle body, wherein the movable closing member is longer than the stationary closing member, and wherein the movable closing member covers the stationary closing member from above in the vertical direction of the vehicle body.

8. The vehicle seat rail assembly according to claim 7, wherein the movable closing member is provided with guided projections that protrude laterally inward from rear ends, in the longitudinal direction of the vehicle, of a pair of guide walls that extend from opposite lateral ends of the movable closing member, and wherein the stationary closing member is provided with first stationary closing member grooves opening outward in the lateral direction of the stationary closing member, and extend in the longitudinal direction of the vehicle, and engaged with the guided projections.

9. The vehicle seat rail assembly according to claim 7, wherein the movable closing member is provided with support grooves that extend in the longitudinal direction of the vehicle and open laterally outward in the paired guide walls, and wherein the stationary closing member is provided with second stationary closing member grooves that open outward in the lateral direction of the stationary closing member, extend in the longitudinal direction of the vehicle, and engage the support grooves.

10. The vehicle seat rail assembly according to claim 1, wherein the stationary closing member is formed separately from the lower rail.

11. The vehicle seat rail assembly according to claim 1, wherein the stationary closing member is formed integrally with the lower rail.

12. The vehicle seat rail assembly according to claim 1, wherein the lower rail is embedded in a floor of the vehicle.

13. A vehicle seat rail assembly comprising:

a lower rail having a groove portion that extends in the longitudinal direction of a vehicle body and that opens upward in the vertical direction of the vehicle body and adapted to be supported stationary relative to the vehicle body;

an upper rail adapted to be attached to a vehicle seat and guided by the lower rail for sliding movement in the longitudinal direction of the lower rail;

a stationary closing member disposed between a pair of groove walls defining the groove portion of the lower rail and adapted to be supported stationary relative to the vehicle body, the stationary closing member is of a rectangular block shape that extends in the longitudinal direction of the vehicle, the stationary closing member is provided with first stationary closing member grooves opening outward in the lateral direction of the stationary closing member, and the first stationary closing member grooves extend in the longitudinal direction of the vehicle; and a movable closing member disposed between the paired groove walls of the lower rail and supported for sliding movement in the longitudinal direction of the lower rail relative to at least one of the lower rail and the stationary closing member, the movable closing member extends in the longitudinal direction of the vehicle and the moveable closing member has a generally U-shaped cross-section that opens downward in the vertical direction of the vehicle body, the movable closing member is longer than the stationary closing member, the movable closing member covers the stationary closing member from above in the vertical direction of the vehicle body, the movable closing member is provided with guided projections that protrude laterally inward from rear ends, in the longitudinal direction of the vehicle, of a pair of guide walls that extend from opposite lateral ends of the movable closing member;

wherein the guided projections of the movable closing member engage with the first stationary closing member grooves of the stationary closing member.

14. A vehicle seat rail assembly comprising:

a lower rail having a groove portion that extends in the longitudinal direction of a vehicle body and that opens upward in the vertical direction of the vehicle body and adapted to be supported stationary relative to the vehicle body;

an upper rail adapted to be attached to a vehicle seat and guided by the lower rail for sliding movement in the longitudinal direction of the lower rail;

a stationary closing member disposed between a pair of groove walls defining the groove portion of the lower rail and adapted to be supported stationary relative to the vehicle body, the stationary closing member is of a rectangular block shape that extends in the longitudinal direction of the vehicle, the stationary closing member is provided with second stationary closing member grooves that open outward in the lateral direction of the stationary closing member, the second stationary closing member grooves extend in the longitudinal direction of the vehicle; and a movable closing member disposed between the paired groove walls of the lower rail and supported for sliding movement in the longitudinal direction of the lower rail relative to at least one of the lower rail and the stationary closing member, the movable closing member extends in the longitudinal direction of the vehicle and the moveable closing member has a generally U-shaped cross-section that opens downward in the vertical direction of the vehicle body, the movable closing member is longer than the stationary closing member, and the movable closing member covers the stationary closing member from above in the vertical direction of the vehicle body, the movable closing member is provided with support grooves that extend in the longitudinal direction of the vehicle and open laterally outward in the paired guide walls;

wherein the second stationary closing member grooves of the stationary closing member engage with the support grooves of the movable closing member.

15. The vehicle seat rail assembly according to claim 14 further comprising:

an engagement member secured to the upper rail, the engagement member having a pair of side walls and an upper wall forming a generally inverted U-shape, each of the pair of side walls having an engagement projection that protrudes laterally inwardly, the engagement member is attached to the movable closing member from above and the engaging projections engage with the support grooves of the moveable closing member.

* * * * *